(12) United States Patent
Long et al.

(10) Patent No.: US 9,518,347 B2
(45) Date of Patent: Dec. 13, 2016

(54) METHOD, SYSTEM, APPARATUS, AND PROGRAM FOR INSTANTLY ESTIMATING THE NUMBER OF STITCHES FOR AN EMBROIDERED DESIGN

(75) Inventors: Kevin Long, St. Louis, MO (US); Jon Bishop, Carlinville, IL (US)

(73) Assignee: WORLDWIDE PRODUCTS INC., St. Louis, MO (US)

( * ) Notice: Subject to any disclaimer, the term of this patent is extended or adjusted under 35 U.S.C. 154(b) by 711 days.

(21) Appl. No.: 13/092,845

(22) Filed: Apr. 22, 2011

(65) Prior Publication Data

US 2012/0072375 A1     Mar. 22, 2012

Related U.S. Application Data

(60) Provisional application No. 61/326,832, filed on Apr. 22, 2010.

(51) Int. Cl.
| | |
|---|---|
| G06F 17/00 | (2006.01) |
| D05B 19/02 | (2006.01) |
| D05C 5/00 | (2006.01) |
| G06Q 30/02 | (2012.01) |

(52) U.S. Cl.
CPC ............... *D05B 19/02* (2013.01); *D05C 5/00* (2013.01); *G06Q 30/0283* (2013.01); *D05D 2305/34* (2013.01)

(58) Field of Classification Search
CPC .. D05C 5/04; G06Q 30/0283; G06Q 30/0206; G06T 11/60; D05B 19/02

USPC ........ 700/138; 705/400, 26.5, 7.35; 345/629
See application file for complete search history.

(56) References Cited

U.S. PATENT DOCUMENTS

| | | | |
|---|---|---|---|
| 2007/0192210 A1* | 8/2007 | Lunetta | G06Q 30/02 705/26.5 |
| 2010/0106283 A1* | 4/2010 | Harvill | D05C 5/04 700/138 |
| 2012/0127204 A1* | 5/2012 | Distler | G06T 15/04 345/647 |

OTHER PUBLICATIONS

"The BeadSprites Forum: Photoshop is Very Useful—Pixel Count", Oct. 17, 2008, posted by: DoctorOctoroc, 8 pages.*

* cited by examiner

*Primary Examiner* — Shannon Campbell
*Assistant Examiner* — Freda A Nelson
(74) *Attorney, Agent, or Firm* — Ladas & Parry LLP (57) ABSTRACT

A method implemented on a computer having a processor and a memory coupled to the processor for determining an estimated number of stitches for an embroidered design. The method includes uploading a file containing a design comprised of at least one of art and text; flattening the design into a flat file; determining a number of pixels that are non-transparent in the flat file; determining a percentage of non-transparent pixels in a total pixel area available for decorating; estimating a measurement of an area to be decorated using the percentage of non-transparent pixels; and determining the estimated the number of stitches in the design using the measurement of the area to be decorated.

6 Claims, 7 Drawing Sheets

| Quantity:<br># of pieces<br>or locations | 12 | 36 | 72 | 144 | 288 | 500 | 1000 | 2500 |
|---|---|---|---|---|---|---|---|---|
| Up to 5999 Stitches | 4.95 | 4.95 | 3.25 | 2.90 | 2.55 | 2.20 | 1.95 | 1.65 |
| 6000 Stitches | 5.95 | 5.95 | 3.95 | 3.75 | 3.45 | 3.15 | 2.25 | 2.05 |
| 7000 Stitches | 6.45 | 6.45 | 4.35 | 4.10 | 3.65 | 3.30 | 2.55 | 2.20 |
| 8000 Stitches | 6.95 | 6.95 | 4.65 | 4.45 | 3.85 | 3.45 | 2.85 | 2.30 |
| 10000 Stitches | 7.45 | 7.45 | 5.65 | 5.35 | 4.75 | 4.45 | 3.75 | 3.30 |
| 12000 Stitches | 8.45 | 8.45 | 7.55 | 5.95 | 5.55 | 4.65 | 4.15 | 3.95 |
| 15000 Stitches | 9.55 | 9.55 | 8.55 | 6.75 | 6.45 | 5.95 | 5.55 | 5.25 |
| 25000 Stitches | 15.95 | 15.95 | 12.95 | 9.95 | 8.55 | 7.25 | 6.75 | 6.25 |

FIG. 6

METHOD, SYSTEM, APPARATUS, AND PROGRAM FOR INSTANTLY ESTIMATING THE NUMBER OF STITCHES FOR AN EMBROIDERED DESIGN

RELATED APPLICATION

This application claims the benefit of U.S. Provisional Application No. 61/326,832 filed on Apr. 22, 2010, the entire contents of which are incorporated herein by reference.

BACKGROUND OF THE INVENTION

Field of the Invention

The present invention generally relates to estimating the number of stitches for a logo or design, and more particularly to a method, system, apparatus, and program for instantaneously estimating the number of stitches for an uploaded logo or design that is meant for an embroidered article.

Related Art

Articles, such as an article of clothing or a bag or a purse, may of course be embroidered with a design or logo. Often a customer wishes to specifically select the design or logo to be embroidered on to the article of clothing. In that case, the customer routinely becomes concerned about what the cost of embroidering such design or logo onto the article will be. Therefore, a cost estimate is sought in advance. Typically such estimate is arrived at through a back-and-forth process in which customers and manufacturers e-mail art files and estimates back and forth to each other for the purpose of eventually settling on a cost and logo. This process for arriving at an estimate can be cumbersome, and often takes a number of days. This is because if the cost estimate is unacceptable to the customer, revisions of size or elements in the design are requested, resulting in more time, telephone tag, and frustration.

There exists, therefore, a need to provide a novel method for estimating the number of stitches on an article that overcomes the above-noted and other drawbacks of existing methods.

SUMMARY OF THE INVENTION

The foregoing and other problems are overcome by an improved and novel method for instantaneously and automatically estimating the number of stitches for an uploaded logo or design that is meant for an embroidered article, and also by a system, apparatus, and program that operate in accordance with the method. The present invention allows a customer to upload a logo or build a design online and, for example, instantly know the number of stitches in his or her design.

The applicant noticed how much time and frustration was typically involved in determining the cost of embroidering an article such as a shirt, jacket, cap, bag, or other garment or apparel. A significant factor in determining embroidery cost is the number of stitches in an art design or logo, such as the logo for a team or company or school. Very few companies or organizations know the number of stitches in their logos, especially at various size dimensions.

One attempt to solve such problems has been with paper-based use checkered graph paper. In this regard the logo and design in question is cut out, traced on paper, and the number of squares covered is counted and then multiplied by a factor they provide. However, again, this process can be tedious and time consuming, and it can take a number of days and a significant amount of communication to arrive at an agreed-upon cost and logo.

The present invention is advantageous at least in one respect because currently the process is one in which the customer and seller e-mail art and communications to each other, which typically takes a few days of back and forth communication. By virtue of the present invention the customer can get the estimate instantly and adapt the design as needed "on the fly" and thereafter instantaneously receive another estimate. Accordingly, by virtue of the features of the present invention, the time it takes to get a stitch and cost estimate can be greatly reduced, and the process can be made to be much less tedious. Days of back-and-forth communication can be saved.

The present invention according to one embodiment is an interactive "stitch estimator" in which a customer can upload a logo or build a design online for the purposes of having the logo or design embroidered on an article. The stitch estimator takes the inputs from the customer and provides instantaneously (i.e., in real-time or in near real-time) an estimate of the number of stitches the design will need. From the estimated number of stitches the customer can immediately see how much the shirt or article is going to cost. The customer can then edit and re-submit the design as needed (e.g., by making the design larger or smaller, or deleting or changing portions of the design) and have the stitch estimator instantly recalculate the estimated number of stitches. Then the customer can check out and purchase the desired number of shirts with the logo embroidered thereon.

The present invention according to one embodiment is a method implemented on a computer having a processor and a memory coupled to the processor for determining an estimated number of stitches for an embroidered design. The method includes uploading a file containing a design comprised of at least one of art and text, flattening the design into a flat file, determining a number of pixels that are non-transparent in the flat file, determining a percentage of non-transparent pixels in a total pixel area available for decorating, estimating a measurement of an area to be decorated using the percentage of non-transparent pixels, and determining the estimated the number of stitches in the design using the measurement of the area to be decorated.

The present invention according to another embodiment is a non-transitory computer-readable storage medium storing a program, which, when executed by a computer, performs a method for determining an estimated number of stitches for an embroidered design. The method includes flattening a file containing a design comprised of at least one of art and text, determining a number of pixels that are non-transparent in the flat file, determining a percentage of non-transparent pixels in a total pixel area available for decorating, estimating a measurement of an area to be decorated using the percentage of non-transparent pixels, and determining the estimated the number of stitches in the design using the measurement of the area to be decorated.

The present invention according to another embodiment is a method implemented on a computer having a processor and a memory coupled to the processor for providing a cost estimate for an embroidered design. The method includes a) uploading a design created or selected by a user, b) adding text or art to the design if instructed by the user, c) editing the design if instructed based on user inputs, d) determining an estimated number of stitches for the design, e) determining an estimated cost for the design based on the estimated number of stitches, f) displaying the estimated number of stitches and the estimated cost, and g) returning to step c) if instructed by the user.

The present invention according to another embodiment is a system implemented on a computer having a processor and a memory coupled to said processor for providing a cost estimate for an embroidered design. The system includes a design creator module for creating a design, a stitch estimator module for determining an estimated number of stitches for the design, and a cost estimator module for determining a cost estimate for the selected design based on the estimated number of stitches.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures:

FIG. 2, which includes

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

The present invention allows a customer to upload a logo or build a design online and instantly know the number of stitches in their design. For example, the customer can know instantaneously that a particular 3.5" design would be 9500 stitches and therefore $11.40 per shirt to embroider. The customer can then, for example, size the design down to 2.5" wide, 6458 stitches, and $6.70, thereby saving himself $4.70. This would normally take 2 to 4 days of back and forth communication. By virtue of the features of the present invention, such time period can be greatly reduced, as the customer can instantly receive an estimate, re-submit a revised design or logo, instantly receive a revised estimate, and then proceed to checkout to make the purchase.

Figure 1:
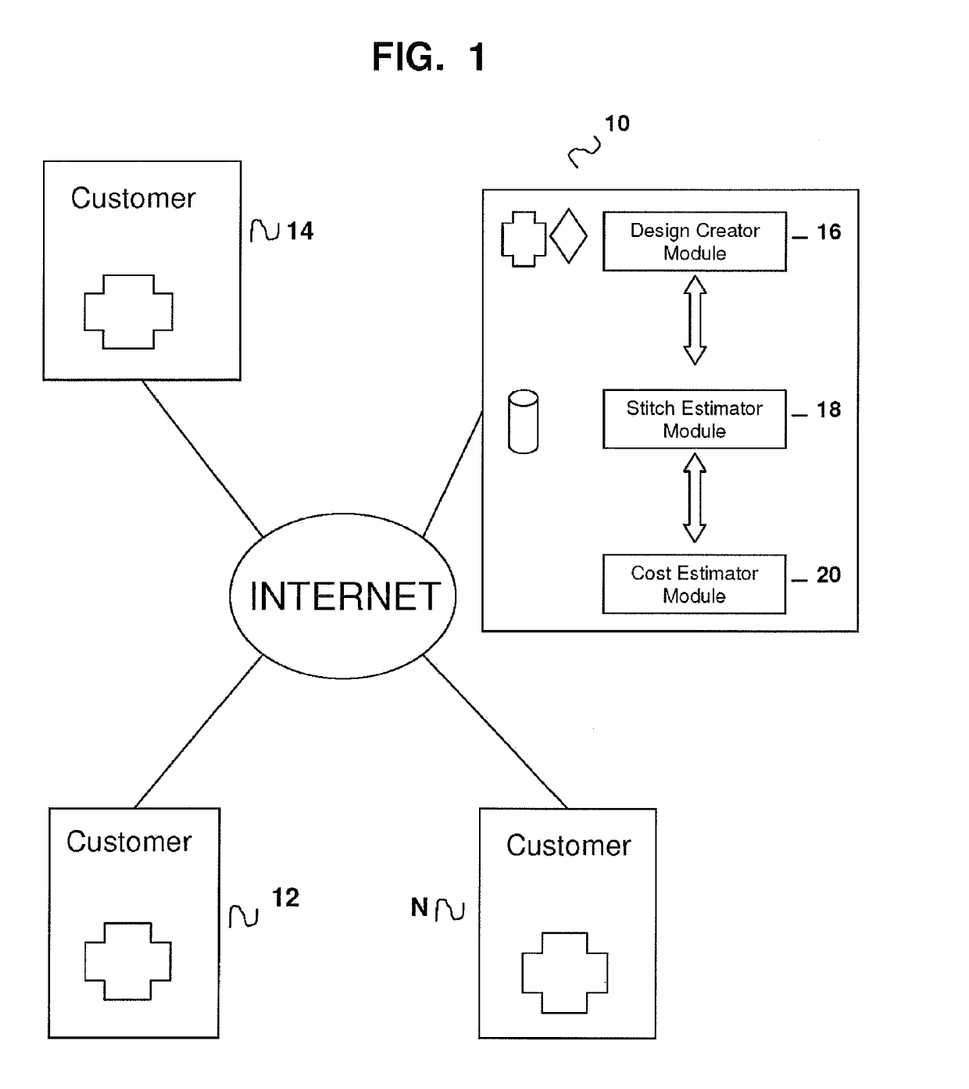
FIG. 1 shows an example aspect of the present invention using the Internet, wherein the invention is implemented via a website or web portal that communicates with Customers over the Internet.

FIG. 1 shows an example aspect of the invention using the Internet or a wide area network (WAN), wherein the invention is implemented via a web portal or website 10 including or hosted by a web server. The website 10 can communicate through the Internet with a number of end users having terminals 12, 14, . . . N, who may act as Customers. The website 10 can run and support network-based applications including software routines and computer modules to perform at least some of the functions of the present invention. (For the sake of simplicity, Internet Service Providers, routers, firewalls, and the like that are well known in the art are not shown.)

The Customers can access the website 10 through their own personal computing system or terminal, which may be a lap top, a desk top, a mobile device, etc., including, for example, a keyboard, a mouse, a touch screen, a trackball, and/or any other suitable type of user-operable input device (s). The output user interface may include, for example, a video display, a liquid crystal or other flat panel display, a speaker, and/or any other suitable type of output device for enabling a user to perceive outputted information. Such mobile device could include beepers/pagers, such as Blackberry pagers, that have visual and interactive capabilities, along with a means of downloading or uploading content (for example, over the air or attached to a computer); another example is a PDA (Personal Digital Assistant) such as an iPhone, Android, PalmPilot, SmartPhone, Tablet PC, or PocketPC.

Figure 2A:
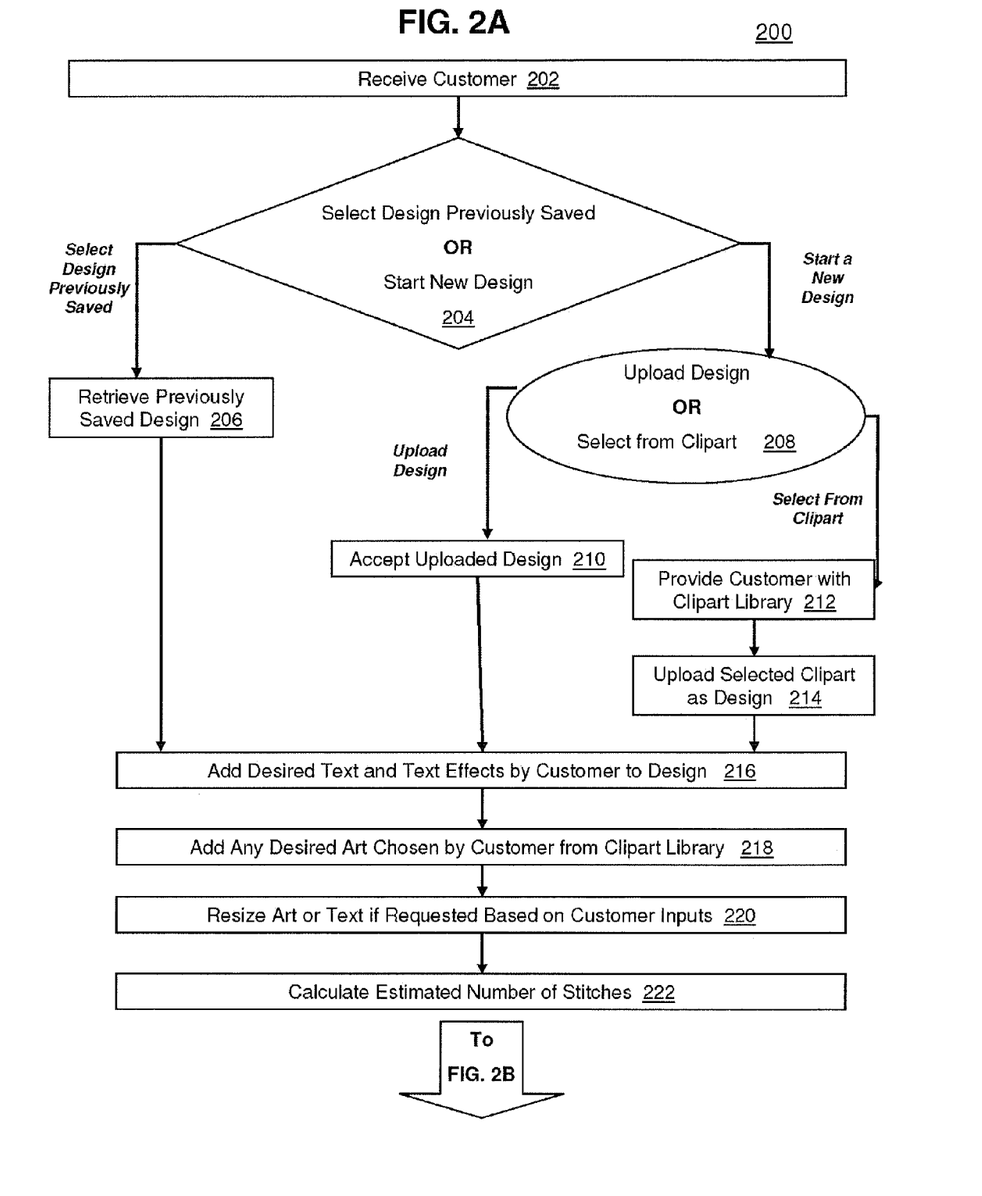
FIGS. 2A and 2B, shows a method of operation of the present invention according to an example aspect, in particular using the website shown in FIG. 1.
Figure 2B:
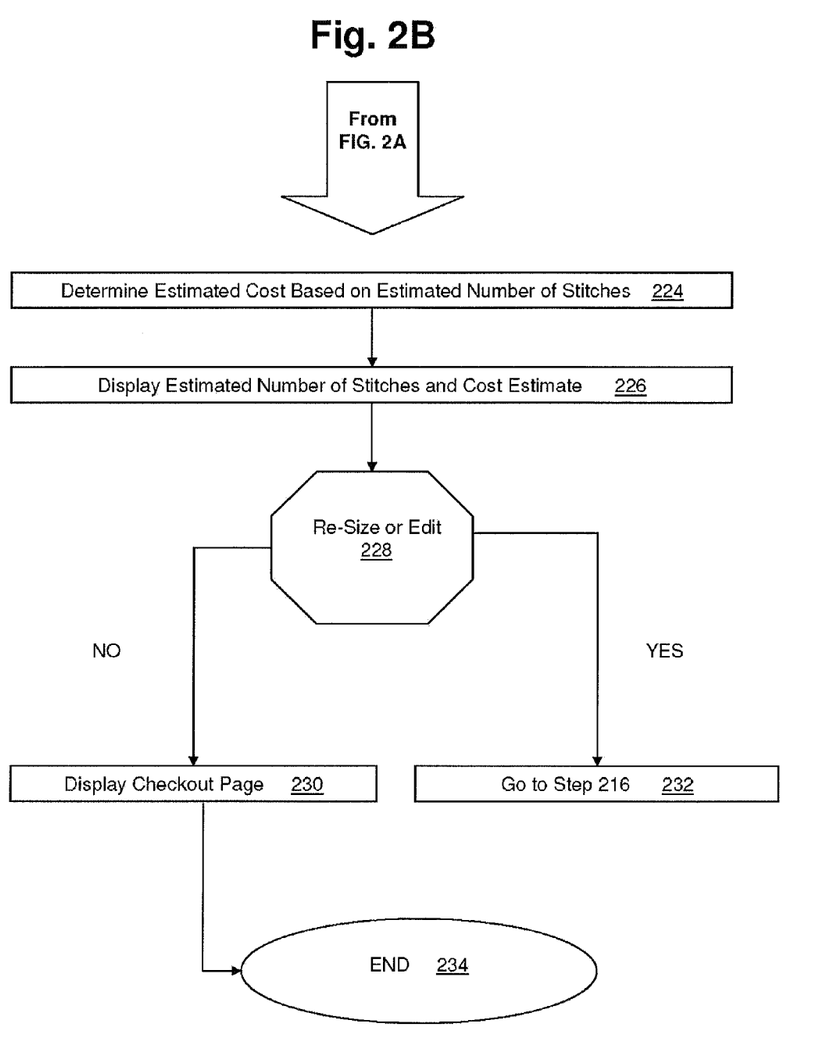

FIG. 2, which includes FIGS. 2A and 2B, shows a method 200 of operation of the present invention according to an example aspect, in particular using the website 10 shown in FIG. 1. It is of course to be understood that this is only an example, not meant to be all encompassing, of steps that may be included in the method.

The method 200 shown in FIG. 2 may be implemented using, for example, software or a computer program(s) that reside on the server or computer hosting the website 10. The server or computer in one example is a system having a design creator module 16, a stitch estimator module 18, and a cost estimator module 20. These modules can be software and/or hardware modules configured to perform the functions described in the methods described herein. The computer program(s) may be embodied on a computer-readable medium or others as explained in further detail below.

The method 200 allows an online visitor or Customer to log on to the website 10 and then proceed to submit a design by uploading their art or logo or by using Clip art provided by the website 10 and then adding text and shapes if desired. When the Customer is satisfied with the design, the Customer can click on a button and the method 200 immediately returns an estimate of the stitch count and cost for the particular design or logo submitted. The Customer can change sizes and elements multiple times and recalculate after each change, thereby instantly saving time and frustration.

As an example, and referring to FIG. 2, in step 202 the website 10 receives a Customer, e.g., at a page labeled "Apparel Decoration." In step 204 the Customer is asked whether he wishes to select a design that the Customer previously saved or to start a new design. If the Customer opts to select a design previously saved, the method 200 proceeds to step 206, and the previously saved design is retrieved.

On the other hand, if the Customer opts to start a new design, the method 200 proceeds to step 208, where the Customer is prompted as to whether he wishes to upload a new design or whether he wishes to select a new design from Clip art provided by the website 10. If the Customer wishes to upload a new design, the method 200 proceeds to step 210, and the uploaded design is retrieved. If on the other hand the Customer wishes to select a new design from Clip art provided by the website 10, the method 200 proceeds to step 212, where the Customer is provided with Clip art options from the website 10 and then, in step 214, the selected Clip art is uploaded as the selected design.

The flow from each of steps 206, 210, and 214 proceeds to step 216, where any text and text effects inputted by the customer are added to the selected design. In step 218, any art (e.g., from the Clip art library) chosen by the customer is accepted and added to the selected design. In step 220 the art or text is resized (or portions changed, added, or deleted) based on inputs from the Customer. Steps 202-220 may be performed using, for example, the design creator module 16.

In step 222 an estimate of the number of stitches is calculated following a Customer request therefor. Step 222 may be performed using, for example, the stitch estimator module 18. In step 224 an estimated cost is determined based on the estimated number of stitches calculated in step 222. Step 224 may be performed using, for example, the cost estimator module 20. In step 226 the estimated number of stitches as calculated in step 222 is displayed on the website 10, along with a cost estimate determined based on the number of stitches.

The Customer is then queried in step 228 as to whether he wishes to re-size or re-edit the selected design, so that a new estimate can be obtained. If the result of the query in step 228 is YES, the method 200 returns (step 232) to step 216. If the result of the query in step 228 is NO then in step 230 a checkout page is displayed on the website 10 and then the method 200 ends in step 232.

Figure 3:
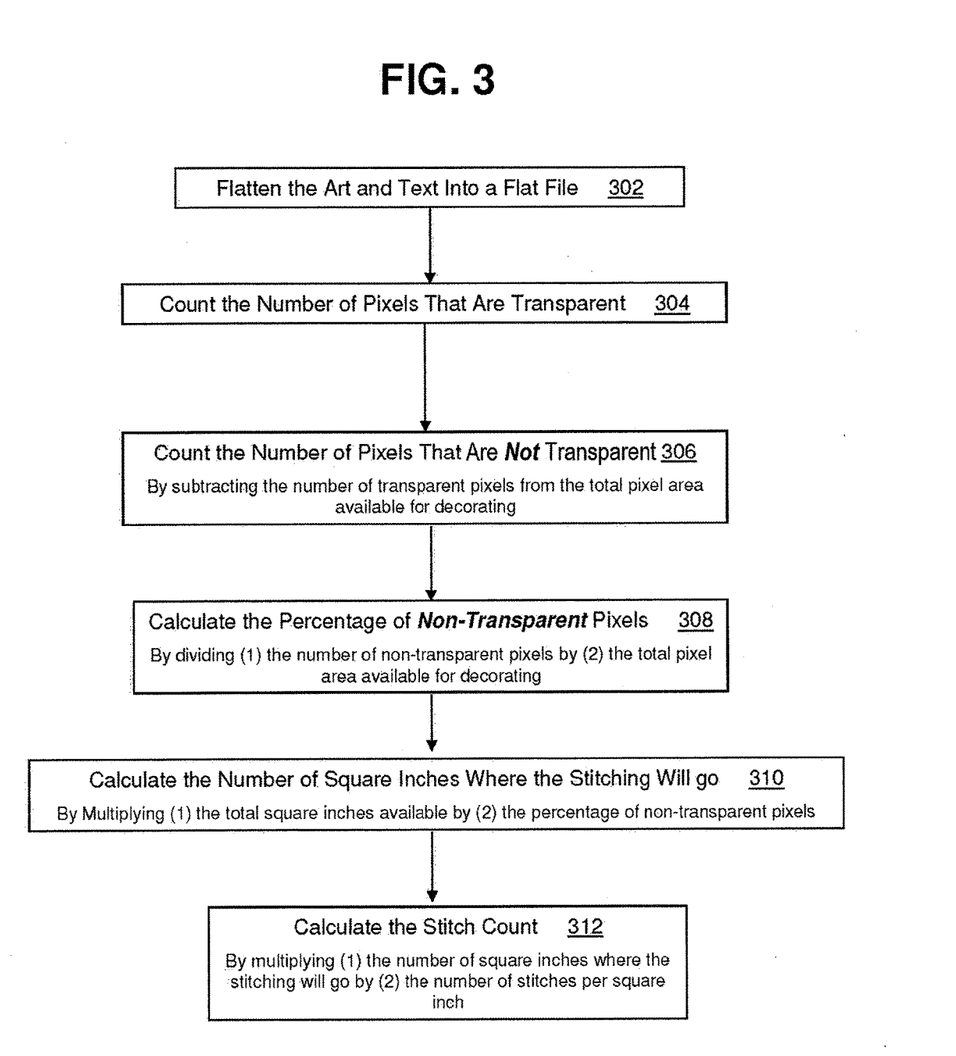
FIG. 3 is a flowchart showing an example embodiment of the calculation performed in step 222 of FIG. 2.

FIG. 3 is a flowchart showing an example embodiment of the calculation performed in step 222 of FIG. 2; as noted above, in step 222 an estimate of the number of stitches is calculated.

In step 302 all of the art and text is "flattened" into a flat file. That is, before the file is flattened, there are typically multiple files stacked on top of each other, e.g., text+clipart+spaces+lines. They can be in many different file formats, including, but not limited to, *.jpg, *.gif, *.png, *.ai, etc. With "flattened files," in effect, overlapping images are not being counted. For example, on a sheet of paper 8×8 inches, there are 64 square inches. If two black squares 4×4 inches each are placed on the sheet and the they do not overlap, then there are 16 square inches in each square. 16+16=32 square inches total, out of the 64, or 50% coverage. If the two squares are overlapped ½ on top of the other there are now 16+8=24 square inches total, out of the 64, or 37.5% coverage.

Figure 4:
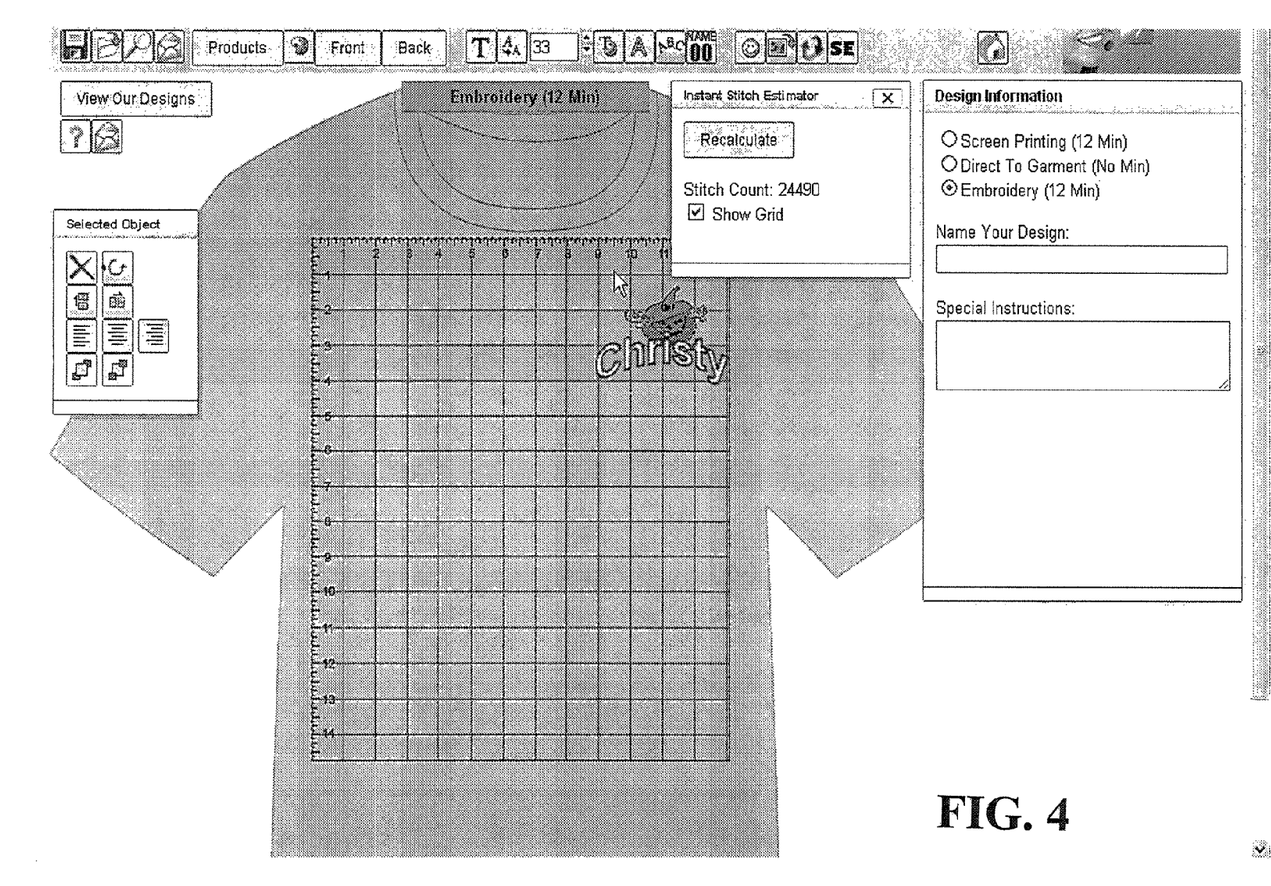
FIG. 4 is an example screen shot.

It is noted that the design or logo contained in the flat file may be displayed to the Customer to scale, for example, in inches. See, e.g., FIG. 4, which is an example screen shot showing the text "Christy" and the accompanying design, displayed to scale in inches. In this way, the Customer can see how many inches the design or logo will take up on the embroidered article.

It is also noted that the flattened maximum decorating area is known to start. If the maximum decorating area is 13" wide×14" tall, for example, then the maximum decorating area would be 13×14=182 square inches.

It is further noted that the total pixel area available for decorating, as shown on the screen, is also known to start. For example, the total pixel area available for decorating may be 350 pixels×400 pixels=140,000 pixels. Using this example, the 140,000 square pixels (350×400) are being placed into a 182 square inch (13×14) decorating area. Then, 140,000 square pixels divided by 182 square inches gives approximately 769 square pixels per square inch.

In step 304 the number of pixels that are transparent are counted. For example, there may be 137,600 pixels that are transparent. By way of one example, one way the method determines the number of transparent pixels is by using the "convert" command in Image Magick®. Image Magick® is an art manipulation program that can be stored on the server.

In step 306 the number of pixels that are transparent (e.g., 137,600) is subtracted from the total pixel area available for decorating (e.g., 140,000). The result (e.g., 2,400) is the number of pixels that are not transparent. Thus, using this example, there would be 2,400 (140,000−137,600) pixels that are not transparent, where stitching will go.

In step 308 the percentage of non-transparent pixels is calculated. In this example this calculation would be 2,400 divided by 140,000=1.71%.

In step 310 the method uses the percentage of non-transparent pixels to determine the number of square inches where the stitching will go, by multiplying (1) the total square inches available by (2) the percentage of non-transparent pixels that was calculated in step 308. Thus, in this example, 182 total square inches available×0.0171=3.12 square inches. Accordingly, there are 3.12 square inches where the stitching will go in this example.

In step 312 the method calculates the stitch count by multiplying (1) the number of square inches where the stitching will go by (2) the number of stitches per square inch. The number of stitches per square inch is a factor that can change based on the type of fabric and number of colors. For example, if there are 5400 stitches per square inch, it is calculated that the stitch count will be 3.12×5400=16,848 stitches.

Figure 5:
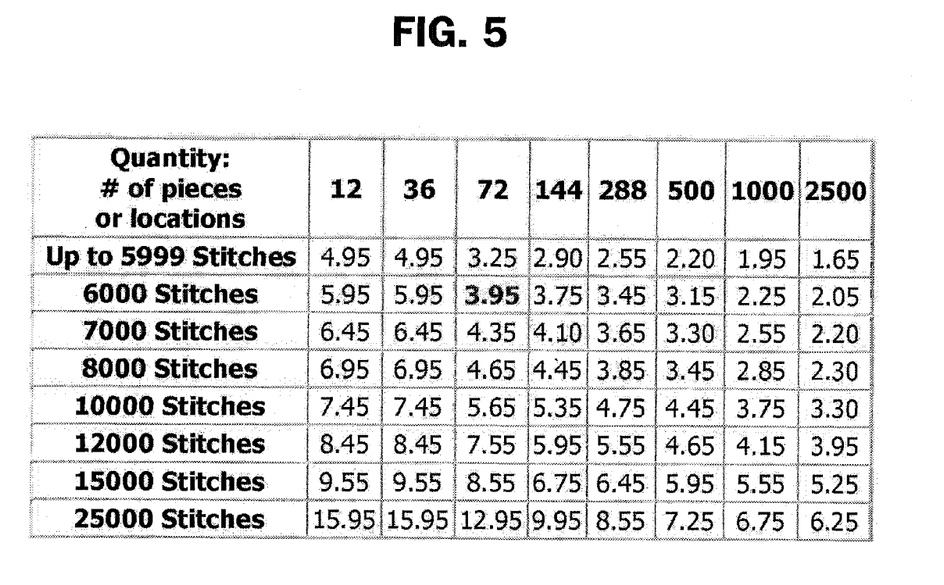
FIG. 5 is an example of a lookup table which provides a corresponding cost for a given number of stitches.

It is noted that in step 224 of FIG. 2 the method determines an estimated cost based on the estimated number of stitches calculated in step 222. This can be done, e.g., by consulting a lookup table which provides a corresponding cost for a given number of stitches. For example, if there are 16,848 stitches, the method determines based on a table that correlates the number of stitches with the cost per article, that it would cost $9.55 per shirt or embroidered article. See, e.g., the table shown in FIG. 5, which is an example showing price points for various quantities of orders (e.g., number of pieces or locations) depending on the estimated number of stitches. The cost per embroidered article is then multiplied by the number of requested articles to determine the estimated cost. In this example, for 12 shirts the charge for the embroidery is 12×$9.55=$114.60. As noted above, in step 226 of FIG. 2, the estimated number of stitches is displayed along with a cost estimate.

Accordingly, once a Customer has chosen a product and a location, pursuant to FIGS. 2 and 3 the method determines the overall square inches that are in a given decorating area. The method then calculates the area that the chosen design utilizes by counting the remaining transparent pixels in the given area and then translates that into the number of stitches necessary to stitch the chosen design.

Among the challenges overcome by the applicant was converting different format files to working formats while limiting distortion, and maintaining the relative position and size of all elements; Clip art, logos, and images uploaded, text and text modifications. The present invention can accomplish this by storing original and modified images and elements for editing.

Example Implementation

Figure 6:
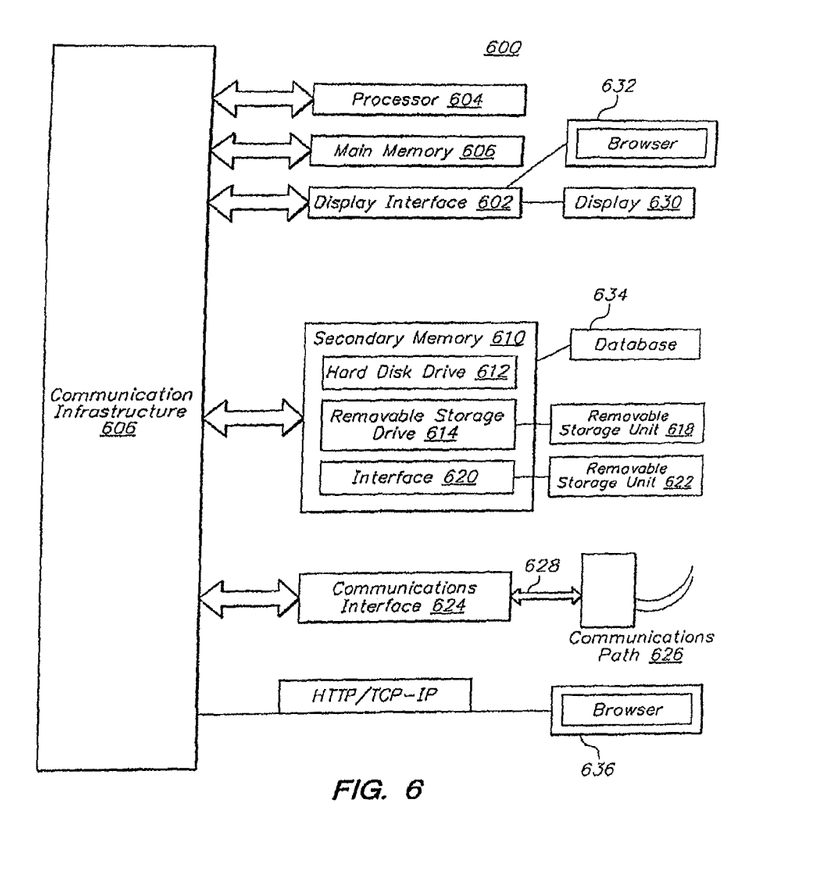
FIG. 6 shows an example implementation of the present invention.

The present invention or any part(s) or function(s) thereof, including but not limited to portal or website 10, the server or computer having the design creator module 16, the stitch estimator module 18, and the cost estimator module 20, and end user terminals 12, 14, . . . , N, may be implemented using hardware, software, or a combination thereof, and may be implemented in one or more computer systems or other processing systems. Useful machines for performing some or all of the operations of the present invention include digital computers or similar devices. In fact, in one embodiment, the present invention is directed towards one or more computer systems equipped to carry out the functions described herein. An example of such computer system 600 is shown in FIG. 6.

The computer system 600 includes at least one processor 604. The processor 604 is connected to a communication infrastructure 606 (e.g., a communications bus or a network), which is in communication with, inter alia, a browser 636 connected to an internet or intranet. Although various software embodiments are described herein in terms of this exemplary computer system 600, after reading this description, it will become apparent to a person skilled in the relevant art(s) how to implement the invention using other computer systems and/or architectures.

The computer system 600 also includes a display interface 602 that forwards graphics, text, and other data from the communication infrastructure 606 (or from a frame buffer (not shown)) for display on a display unit 630 or on a browser 632 connected to an intranet or Internet. The computer system 600 also includes a main memory 608, which preferably is a random access memory (RAM), and may also include a secondary memory 610. The secondary memory 610 may include, for example, a hard disk drive 612 and/or a removable storage drive 614 (e.g., a floppy disk drive, an optical disk drive, and the like). The removable storage drive 614 reads from and/or writes to a removable storage unit 618 in a well-known manner. The removable storage unit 618 may be, for example, a floppy disk, an optical disk, and the like, which is written to and read by the removable storage drive 614. As will be appreciated, the removable storage unit 618 includes a computer-usable storage medium having stored therein computer software and/or data.

In alternative embodiments, the secondary memory 610 may include other similar devices for allowing computer programs or other instructions to be loaded into the computer system 600. Such devices may include a removable storage unit 622 and an interface 620 (e.g., a program cartridge); a removable memory chip, and an associated memory socket; and other removable storage units 622 and interfaces 620 that allow software and data to be transferred from the removable storage unit 622 to the computer system 600.

The computer system 600 may also include a communications interface 624, which allows software and data to be transferred between the computer system 600 and external devices (not shown). Examples of the communications interface 624 may include a modem, a network interface (e.g., an Ethernet card), a communications port, a Personal Computer Memory Card International Association ("PCMCIA") interface, and the like. Software and data transferred via the communications interface 624 are in the form of signals 628, which may be electronic, electromagnetic, optical or another type of signal that is capable of being received by the communications interface 624. These signals 628 are provided to the communications interface 624 via a communications path 626 (e.g., a channel). The communications path 626 carries the signals 628 and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit 618 used with the removable-storage drive 614, a hard disk installed in the hard disk drive 612, or the signals 628, for example. These computer program products provide software to the computer system 600. The present invention may be implemented or embodied as one or more of such computer program products.

Computer programs (also referred to as computer control logic) are stored in the main memory 608 and/or the secondary memory 610. The computer programs may also be received via the communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the present invention is implemented using software, the software may be stored in a computer program product and loaded into the computer system 600 using the removable-storage drive 614, the hard drive 612, or the communications interface 624. The control logic (software), when executed by the processor 604, causes the processor 604 to perform the functions of the present invention as described herein. In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s). In yet another embodiment, the present invention is implemented using a combination of both hardware and software. Computer modules may carry out various features of the present invention.

While the invention has been particularly shown and described with respect to a preferred embodiment thereof, it should be understood that the embodiment has been presented by way of example, and not limitation. It will be apparent to persons skilled in the relevant art(s) that various changes in form and detail can be made therein without departing from the spirit and scope of the present invention. Thus, the present invention should not be limited by any above-described exemplary embodiment, but should be defined only in accordance with the following claims and their equivalents.

Also, it should be understood that the figures illustrated in the attachments, which highlight functionality and advantages of the present invention, are presented for example purposes only. The architecture of the present invention is sufficiently flexible and configurable, such that it may be utilized (and navigated) in ways other than that shown in the figures.

The invention claimed is:

1. A method implemented on a computer having a processor and a memory coupled to said processor for determining an estimated number of stitches and an estimated price for an embroidered design, said method comprising the steps of:
    a) uploading a file containing a design comprised of at least one of art and text;
    b) flattening the design into a flat file;
    c) determining a number of pixels that are non-transparent in the flat file;
    d) determining a percentage of non-transparent pixels in a total pixel area available for decorating;

e) estimating a measurement of an area to be decorated using the percentage of non-transparent pixels;

f) determining the estimated the number of stitches in the design using the measurement of the area to be decorated; and g) determining and displaying a cost estimate for the design based on the estimated number of stitches;

said method further comprising editing the design, including re-sizing the design or adding or deleting portions of the design, when instructed by a user and then repeating steps a to g;

wherein steps b-g are performed by said processor.

2. The method of claim 1, in which the cost estimate is determined using a lookup table containing a cost per article based on a quantity of articles and the estimated number of stitches.

3. A non-transitory computer-readable storage medium storing a program, which, when executed by a computer, performs a method for determining an estimated number of stitches and an estimated price for an embroidered design, said method comprising the steps of:

a) uploading a file containing a design comprised of at least one of art and text;

b) flattening the design into a flat file;

c) determining a number of pixels that are non-transparent in the flat file;

d) determining a percentage of non-transparent pixels in a total pixel area available for decorating;

e) estimating a measurement of an area to be decorated using the percentage of non-transparent pixels;

f) determining the estimated the number of stitches in the design using the measurement of the area to be decorated; and g) determining and displaying a cost estimate for the design based on the estimated number of stitches;

said method further comprising editing the design, including re-sizing the design or adding or deleting portions of the design, when instructed by a user and then repeating steps a to g;

wherein steps b-g are performed by said processor.

4. The computer-readable storage medium of claim 3, in which the cost estimate is determined using a lookup table containing a cost per article based on a quantity of articles and the estimated number of stitches.

5. A method implemented on a computer having a processor and a memory coupled to said processor for providing a cost estimate for an embroidered design, said method comprising the steps of:

a) uploading a design created or selected by a user;

b) adding text or art to the design if instructed by the user;

c) editing the design, including re-sizing the design, adding portions of the design or deleting portions of the design, if instructed based on user inputs;

d) flattening the design into a flat file;

e) determining a number of pixels that are non-transparent in the flat file;

f) determining a percentage of non-transparent pixels in a total pixel area available for decorating;

g) estimating a measurement of an area to be decorated using the percentage of non-transparent pixels;

h) determining an estimated number of stitches for the design using the measurement of the area to be decorated;

i) a determining an estimated cost for the design based on the estimated number of stitches;

j) displaying the estimated number of stitches and the estimated cost; and k) returning to step c) if instructed by the user, wherein steps b to i are performed by said processor.

6. A system implemented on a computer having a processor and a memory coupled to said processor for providing a cost estimate for an embroidered design, the system comprising:

a design creator module for creating a design by uploading a design created or selected by a user;

a stitch estimator module for determining an estimated number of stitches for the design, by flattening the design into a flat file;

determining a number of pixels that are non-transparent in the flat file;

determining a percentage of non-transparent pixels in a total pixel area available for decorating;

estimating a measurement of an area to be decorated using the percentage of non-transparent pixels; and determining the estimated the number of stitches in the design using the measurement of the area to be decorated; and a cost estimator module for determining a cost estimate for the selected design based on the estimated number of stitches by estimating a measurement of an area to be decorated using the percentage of non-transparent pixels;

wherein the design creator module includes re-sizing the design, or adding or deleting portions of the design, based on an instruction from a user.

* * * * *